(12) United States Patent
Lee

(10) Patent No.: US 11,323,463 B2
(45) Date of Patent: May 3, 2022

(54) GENERATING DATA STRUCTURES REPRESENTING RELATIONSHIPS AMONG ENTITIES OF A HIGH-SCALE NETWORK INFRASTRUCTURE

(71) Applicant: Datadog, Inc., New York, NY (US)

(72) Inventor: Homin Lee, Jersey City, NJ (US)

(73) Assignee: Datadog, Inc., New York, NY (US)

( * ) Notice: Subject to any disclaimer, the term of this patent is extended or adjusted under 35 U.S.C. 154(b) by 317 days.

(21) Appl. No.: 16/442,192

(22) Filed: Jun. 14, 2019

(65) Prior Publication Data

US 2020/0396232 A1 Dec. 17, 2020

(51) Int. Cl.
| | |
|---|---|
| *H04L 29/06* | (2006.01) |
| *G06F 16/2457* | (2019.01) |
| *H04L 12/24* | (2006.01) |
| *H04L 41/0631* | (2022.01) |
| *H04L 41/069* | (2022.01) |

(52) U.S. Cl.
CPC .... *H04L 63/1425* (2013.01); *G06F 16/24578* (2019.01); *H04L 41/069* (2013.01); *H04L 41/0631* (2013.01)

(58) Field of Classification Search
CPC ............. H04L 63/1425; H04L 41/0631; H04L 41/069; H04L 41/065; H04L 41/145; G06F 16/24578; G06F 11/3051; G06F 11/323; G06F 11/3476; G06F 17/40
USPC ......................................................... 726/22
See application file for complete search history.

(56) References Cited

U.S. PATENT DOCUMENTS

| | | | | |
|---|---|---|---|---|
| 5,276,789 A * | 1/1994 | Besaw | ..................... | G06F 30/18 345/440 |
| 7,013,395 B1 * | 3/2006 | Swiler | ................. | H04L 63/1433 713/151 |
| 7,337,163 B1 * | 2/2008 | Srinivasan | .......... | G06F 16/2453 |
| 7,539,697 B1 * | 5/2009 | Akella | ..................... | H04L 51/32 |
| 8,185,558 B1 * | 5/2012 | Narayanan | .............. | G06F 16/24 707/798 |
| 8,844,041 B1 * | 9/2014 | Kienzle | ................... | H04L 45/02 726/25 |
| 9,516,053 B1 * | 12/2016 | Muddu | ............... | H04L 63/1416 |

(Continued)

OTHER PUBLICATIONS

International Search Report and Written Opinion for Intl App No. PCT/US2020/036246, dated Oct. 2, 2020 (15 pages).

*Primary Examiner* — Kambiz Zand
*Assistant Examiner* — Mahabub S Ahmed
(74) *Attorney, Agent, or Firm* — Fish & Richardson P.C.

(57) ABSTRACT

A data structure is provided that identifies relationships between entities of an infrastructure of a computing system and that is configured to update in response to changes in the infrastructure of the computing system. The data structure includes vertices and edges, where each vertex of the data structure represents an entity of the infrastructure, and where each edge of the data structure represents a relationship between entities of the infrastructure. When usage data are received, the usage data are analyzed to determine a correlation between a first operation specifying a first entity and a second operation specifying a second entity. An edge between the first entity specified by the first operation and the second entity specified by the second operation is generated. Event data comprising usage data specifying either the first entity or the second entity is generated.

35 Claims, 7 Drawing Sheets

(56) References Cited

U.S. PATENT DOCUMENTS

| | | | |
|---|---|---|---|
| 10,033,649 B2* | 7/2018 | Eggleston | H04L 41/00 |
| 10,135,848 B2* | 11/2018 | Muddu | H05K 999/99 |
| 10,599,678 B2* | 3/2020 | Kapoor | G06F 16/283 |
| 11,048,740 B2* | 6/2021 | Rogynskyy | G06F 16/29 |
| 11,093,518 B1* | 8/2021 | Lu | G06F 11/3476 |
| 11,196,555 B1* | 12/2021 | Mouraveiko | H04L 69/22 |
| 2002/0152185 A1* | 10/2002 | Satish Jamadagni | H04L 41/16 706/1 |
| 2003/0028803 A1* | 2/2003 | Bunker | H04L 43/00 726/4 |
| 2004/0221190 A1* | 11/2004 | Roletto | H04L 41/0893 714/4.1 |
| 2008/0016115 A1* | 1/2008 | Bahl | H04L 41/22 |
| 2012/0072887 A1* | 3/2012 | Basak | G06F 11/323 717/123 |
| 2012/0137367 A1* | 5/2012 | Dupont | G06F 21/00 726/25 |
| 2012/0158751 A1* | 6/2012 | Tseng | G06F 16/9535 707/751 |
| 2013/0041924 A1* | 2/2013 | Vernier | G06F 16/9024 707/798 |
| 2013/0124538 A1* | 5/2013 | Lee | H04L 63/105 707/749 |
| 2013/0191416 A1* | 7/2013 | Lee | G06F 16/24575 707/771 |
| 2015/0019640 A1* | 1/2015 | Li | G06F 3/00 709/204 |
| 2016/0219066 A1* | 7/2016 | Vasseur | H04L 63/1425 |
| 2016/0373312 A1* | 12/2016 | El-Nasr | H04L 41/145 |
| 2017/0149814 A1* | 5/2017 | Chen | H04L 41/142 |
| 2017/0279660 A1* | 9/2017 | Muntes-Mulero | H04L 41/065 |
| 2017/0279687 A1* | 9/2017 | Muntes-Mulero | H04L 41/065 |
| 2017/0337123 A1* | 11/2017 | Wang | G06F 21/563 |
| 2018/0032941 A1* | 2/2018 | Naous | G06Q 10/067 |
| 2018/0048668 A1* | 2/2018 | Gupta | H04L 63/1433 |
| 2018/0069885 A1* | 3/2018 | Patterson | H04L 63/1416 |
| 2018/0091376 A1* | 3/2018 | Ramakrishna | H04L 41/142 |
| 2018/0227320 A1* | 8/2018 | Ladnai | H04L 63/1433 |
| 2018/0343276 A1* | 11/2018 | Lisle | G06F 16/9577 |
| 2018/0351825 A1* | 12/2018 | Thomson | H04L 41/12 |
| 2019/0058643 A1* | 2/2019 | Knowles | G06F 3/04847 |
| 2019/0260784 A1* | 8/2019 | Stockdale | G06N 20/10 |
| 2019/0342183 A1* | 11/2019 | Nunna | H04L 41/147 |
| 2020/0097560 A1* | 3/2020 | Kulkarni | G06Q 30/0201 |
| 2020/0153679 A1* | 5/2020 | Yu | H04L 41/069 |
| 2020/0204454 A1* | 6/2020 | Sharma | H04L 41/145 |
| 2020/0213201 A1* | 7/2020 | Venugopalan | H04L 43/045 |
| 2020/0226512 A1* | 7/2020 | Epstein | G06Q 30/018 |
| 2020/0285737 A1* | 9/2020 | Kraus | H04L 63/1408 |
| 2020/0372075 A1* | 11/2020 | Rogynskyy | G06F 16/9024 |
| 2021/0021644 A1* | 1/2021 | Crabtree | H04L 63/1441 |
| 2021/0034488 A1* | 2/2021 | Ichihara | G06F 11/323 |

\* cited by examiner

GENERATING DATA STRUCTURES REPRESENTING RELATIONSHIPS AMONG ENTITIES OF A HIGH-SCALE NETWORK INFRASTRUCTURE

TECHNICAL FIELD

The disclosure relates to monitoring computer systems to identify anomalous operation, and more specifically to generating compact data structures representative of computing performance metrics of the computer systems to facilitate identification of the root cause of the anomalous operation.

BACKGROUND

Computer systems can be used to transmit, receive, and/or process data. For instance, a server computer system can be used to receive and store resources (e.g., web content, such as a webpage), and make the content available to one or more client computer systems. Upon receiving a request for the content from a client computer system, the server computer system can retrieve the requested content, and transmit the content to the client computer system to fulfill the request.

Computer systems can be configured to monitor operations and provide data representing those operations as a response to a request for data. The data representing those operations can be in the form of data logs.

SUMMARY

The monitoring system described in this document is configured for determining relationships between systems (e.g., computing systems, applications, etc.) of an information technology (IT) network infrastructure by analyzing data generated by the systems in the network infrastructure. In the IT network infrastructure (hereinafter network infrastructure), each system can be related to one or more entities (alerts, services, teams, monitoring dashboards, performance metrics, tags, etc.) that operate in the network infrastructure. A network infrastructure includes a plurality of the entities related to systems configured to communicate with one another. The monitoring system is configured for receiving a data stream including usage data (e.g., log messages, performance metrics, application traces, event data, and so forth) of one or more of the systems. The monitoring system is configured to generate, from the usage data, a structured representation of the entities of the network infrastructure. The structured representation includes structured data that can be queried by at least one computing system for providing information indicating relationships (e.g., dependencies, correlations, etc.) among entities of the network infrastructure. An output can be provided which shows the relationships between the entities. As the network infrastructure is changed, the structured data is updated to reflect the changed relationships between the entities.

The implementations described herein can provide various technical benefits. For instance, the techniques described herein enable a monitoring system to monitor operations of one or more entities (e.g., applications) of a high-scale network more efficiently and quickly. For example, in high-scale networks (e.g., data centers, server farms, etc.) there can be dozens, hundreds, thousands, etc. of computing systems requesting data from the computing systems of the high-scale network over time. The network infrastructure of the high-scale networks generally includes many applications that are distributed and dynamic. For example, network infrastructures can include microservice architectures. For example, network infrastructures can include ephemeral containers that are managed using automation and orchestration. Generally, the relationships between entities of a network infrastructure can be changed often.

Determining a cause of operational anomalies of the high-scale network in real-time or near real-time can be difficult as the network infrastructure changes. Generally, monitoring systems for these network infrastructures are used to facilitate monitoring by collecting data about the network infrastructure. For example, the monitoring system can collect metrics data, event data, application traces, logs, and so forth. Monitoring systems can be configured to generate alert(s) when infrastructure systems exhibit anomalous behavior. The monitoring systems can generate dashboard user interfaces for tracking known performance metrics, search through events, request traces, and logs, along with network and process tracking and, profile the collected data to help debug failures and performance problems with the network infrastructure.

However, it can be difficult to determine the cause of issues in the network infrastructure from the data provided by the monitoring system. For example, it can be difficult to determine which data of the data provided by the monitoring systems should be reviewed to determine the cause of anomalous behavior in the network infrastructure. For example, it can be difficult to determine the operational status of a particular system (e.g., an application, computing system, etc.) of the network infrastructure because it is difficult to determine which data from the monitoring system should be reviewed. Existing automated root cause analysis tools generally depend on either user-provided configuration files that map out the network infrastructure (generally requiring repeated updates as the infrastructure changes), or by providing users with both useful signals and useless noise and having the users manually label as relevant or non-relevant.

To overcome the above problems, the monitoring system described in this disclosure is configured to generate a data structure that stores data describing the relationships among the entities of the network infrastructure. When a system is monitored, the monitoring system receives data (e.g., alert data) from an entity. The data of the primary entity generated directly in response to operations of that system. The monitoring system also provides data generated in response to operations of other, secondary entities that are related to the primary entity. The monitoring system determines which entities of the network infrastructure are secondary entities by traversing the data structure. The monitoring system can thus output comprehensive data related to the primary and secondary entities in response to a query for performance data about the primary entity.

The comprehensive data provides a better representation of the operation of the primary entity (and its related system) in the network infrastructure. The monitoring system thus provides more relevant data in response to a user query by providing data which are the key indicators for a system's operation. For example, the monitoring system can determine which applications are critical and which are not without fragile manual configuration of a system diagram.

The data structure that is generated by the monitoring system is flexible because it can respond to changes in the network infrastructure. As new systems or entities are added to the network infrastructure, the monitoring system updates the data structure to reflect the updated relationships between the entities. Expired relationships, such as between two entities that no longer are correlated in behavior, can be removed from the data structure. For example, if an old service is partially replaced by a new service for an application, the monitoring system detects for which operations of the application the new service should be monitored, and for which operations of the application the old service should be monitored. The data structure is updated accordingly, so that if an error occurs for an operation related to a new service, the new, correct services (and their data) are reported by the monitoring system to the user for debugging the application.

In an aspect, a process is performed for providing a data structure that identifies relationships between entities of an infrastructure of a computing system and that is configured to update in response to changes in the infrastructure of the computing system. The process includes receiving usage data representing a plurality of operations performed by the computing system, the usage data specifying, for each operation of the plurality, at least one entity of the infrastructure of the computing system that is related to that operation. The process includes retrieving the data structure including vertices and edges, where each vertex of the data structure represents an entity of the infrastructure, and where each edge of the data structure represents a relationship between entities of the infrastructure. The process includes analyzing the usage data to determine a correlation between a first operation specifying a first entity and a second operation specifying a second entity. The process includes generating an edge between the first entity specified by the first operation and the second entity specified by the second operation. The process includes generating event data including usage data specifying either the first entity or the second entity, where a format of the event data corresponds to positions of the first entity and the second entity in the data structure.

In some implementations, the event data is generated in response to receiving a receiving a query specifying at least one of the first entity and the second entity. The format of event data can include a ranking of portions of the usage data specifying the first entity or the second entity, the ranking derived from traversing the data structure. The event data can include a root cause analysis specifying a common source of anomalies related to the computing system, and where the root cause analysis comprises traversing the data structure from the first entity or second entity.

In an aspect, the generated edge is associated with a confidence score that is derived from the correlation, and the process includes updating the confidence score of the generated edge of the data structure in response to receiving additional usage data representing additional operations that specify the first entity, the second entity, or both the first and second entities.

In some implementations, the actions of the process include selecting a given vertex representing a given entity of the infrastructure; and generating a cluster of entities including the given entity by traversing the data structure along the vertices and the edges, starting with the given vertex, where an additional entity is added to the cluster of entities when the confidence score associated with an edge connecting a vertex representing the additional entity to another vertex representing a clustered entity exceeds a threshold value. The confidence score of the generated edge can be adjusted based on a comparison of an entity type associated with the first entity and the entity type associated with the second entity.

In some implementations, analyzing the usage data to determine the correlation comprises determining that the first operation and the second operation each occur within a threshold period of time with respect to each other. In an aspect, analyzing the usage data to determine the correlation comprises determining that the first operation and the second operation were caused by a common user. In an aspect, analyzing the usage data to determine the correlation comprises analyzing network traffic to determine that the first operation is upstream of the second operation.

Generally, the usage data specifies a new entity that is not represented in the data structure. The process can include adding a new vertex representing the new entity to the data structure; determining that an existing entity is related to the new entity based on a relationship that is explicitly specified in the usage data; and adding a new edge relating the new vertex to an existing vertex of the data structure representing the existing entity.

In some implementations, the actions include determining, based on the usage data, that a given entity of the infrastructure is not related to any operations of the plurality of operations for longer than a threshold period of time; and removing, in response to the determining, a given vertex representing the given entity from the data structure. The entity can include one of a performance metric of the computing system, an alert specifying behavior of the computing system, a service responsive to a request received by the computing system, a team representing a plurality of users of the computing system, a tag, or a dashboard configured to report data about the computing system. The usage data can include at least one of a data log, an application trace, an alert, and a performance metric of the computing system.

In an aspect, a process for processing data representing operations of an infrastructure of a computing system to identify relationships between entities of the infrastructure includes receiving a request for event data that represents operations of the computing system that are related to a given entity of the infrastructure of the computing system. The process includes retrieving a data structure including vertices and edges, where each vertex of the data structure represents an entity of the infrastructure and where each edge of the data structure represents a relationship between entities of the infrastructure, where at least one edge represents a determined relationship between a first entity and a second entity based on an analysis of first operations specifying the first entity and second operations specifying the second entity. The process includes selecting a given vertex representing the given entity of the infrastructure. The process includes generating a set of entities including the given entity by traversing the data structure along the vertices and the edges, starting with the given vertex. The process includes retrieving usage data for each entity of the set; generating the event data by ordering the usage data in an order that is derived from traversing the data structure; and outputting the event data.

In some implementations, the actions of the process include providing a prediction of a future anomaly of the computing system, the prediction derived from the order of the usage data in the event data. In some implementations, the event data comprises a root-cause analysis anomalies related to the computing system, the root cause analysis specifying a common source for the anomalies. In some implementations, the actions include generating a message including at least one suggestion for remediation of at least one anomaly of the computing system.

Generally, an additional entity is added to the set of entities when a confidence score associated with an edge connecting a vertex representing the additional entity to another vertex representing an entity of the set exceeds a threshold value.

In some implementations, the entity comprises one of a performance metric of the computing system, an alert specifying behavior of the computing system, a service responsive to a request received by the computing system, a team representing a plurality of users of the computing system, a tag, or a dashboard configured to report data about the computing system.

In an aspect, a computing system for providing a data structure that identifies relationships between entities of an infrastructure of a given computing system and that is configured to update in response to changes in the infrastructure of the given computing system. The system includes a memory configured for storing data structure data. The system includes a data structure module configured to perform operations including receiving usage data representing a plurality of operations performed by the computing system, the usage data specifying, for each operation of the plurality, at least one entity of the infrastructure of the computing system that is related to that operation. The operations include retrieving the data structure from the memory, the data structure including vertices and edges, where each vertex of the data structure represents an entity of the infrastructure, and where each edge of the data structure represents a relationship between entities of the infrastructure. The operations include analyzing the usage data to determine a correlation between a first operation specifying a first entity and a second operation specifying a second entity. The operations include generating an edge between the first entity specified by the first operation and the second entity specified by the second operation. The operations include generating event data including usage data specifying either the first entity or the second entity, where a format of the event data corresponds to positions of the first entity and the second entity in the data structure.

In some implementations, the event data is generated in response to receiving a receiving a query specifying at least one of the first entity and the second entity. In some implementations, the format of event data comprises a ranking of portions of the usage data specifying the first entity or the second entity, the ranking derived from traversing the data structure. In some implementations, the event data comprises a root cause analysis specifying a common source of anomalies related to the computing system, and the root-cause analysis comprises traversing the data structure from the first entity or second entity.

In an aspect, the generated edge is associated with a confidence score that is derived from the correlation, and the operations further include updating the confidence score of the generated edge of the data structure in response to receiving additional usage data representing additional operations that specify the first entity, the second entity, or both the first and second entities.

In some implementations, the operations further include selecting a given vertex representing a given entity of the infrastructure, and generating a cluster of entities including the given entity by traversing the data structure along the vertices and the edges, starting with the given vertex, where an additional entity is added to the cluster of entities when the confidence score associated with an edge connecting a vertex representing the additional entity to another vertex representing a clustered entity exceeds a threshold value.

Generally, the confidence score of the generated edge is adjusted based on a comparison of an entity type associated with the first entity and the entity type associated with the second entity.

In some implementations, analyzing the usage data to determine the correlation comprises determining that the first operation and the second operation each occur within a threshold period of time with respect to each other. In some implementations, analyzing the usage data to determine the correlation comprises determining that the first operation and the second operation were caused by a common user. In some implementations, analyzing the usage data to determine the correlation comprises analyzing network traffic to determine that the first operation is upstream of the second operation.

In an aspect, the usage data specifies a new entity that is not represented in the data structure, and the operations further include adding a new vertex representing the new entity to the data structure; determining that an existing entity is related to the new entity based on a relationship that is explicitly specified in the usage data; and adding a new edge relating the new vertex to an existing vertex of the data structure representing the existing entity.

In some implementations, the operations include determining, based on the usage data, that a given entity of the infrastructure is not related to any operations of the plurality of operations for longer than a threshold period of time; and removing, in response to the determining, a given vertex representing the given entity from the data structure.

In some implementations, the entity includes one of a performance metric of the computing system, an alert specifying behavior of the computing system, a service responsive to a request received by the computing system, a team representing a plurality of users of the computing system, a tag, or a dashboard configured to report data about the computing system. The usage data includes at least one of a data log, an application trace, an alert, and a performance metric of the computing system.

In an aspect, a system is configured to process data representing operations of an infrastructure of a computing system to identify relationships between entities of the infrastructure. The system includes a memory configured for storing data structure data and a query response module configured to perform operations including receiving a request for event data that represents operations of the computing system that are related to a given entity of the infrastructure of the computing system. The operations include retrieving, from the memory, a data structure including vertices and edges, where each vertex of the data structure represents an entity of the infrastructure and where each edge of the data structure represents a relationship between entities of the infrastructure, where at least one edge represents a determined relationship between a first entity and a second entity based on an analysis of first operations specifying the first entity and second operations specifying the second entity. The operations include selecting a given vertex representing the given entity of the infrastructure; generating a set of entities including the given entity by traversing the data structure along the vertices and the edges, starting with the given vertex. The operations include retrieving usage data for each entity of the set. The operations include generating the event data by ordering the usage data in an order that is derived from traversing the data structure and outputting the event data.

In some implementations, the operations further include providing a prediction of a future anomaly of the computing system, the prediction derived from the order of the usage data in the event data. Generally, the event data comprises a root-cause analysis of anomalies related to the computing system, the root cause analysis specifying a common source for the anomalies.

In some implementations, the operations further include generating a message including at least one suggestion for remediation of at least one anomaly of the computing system. Generally, an additional entity is added to the set of entities when a confidence score associated with an edge connecting a vertex representing the additional entity to another vertex representing an entity of the set exceeds a threshold value. The entity comprises one of a performance metric of the computing system, an alert specifying behavior of the computing system, a service responsive to a request received by the computing system, a team representing a plurality of users of the computing system, a tag, or a dashboard configured to report data about the computing system.

In an aspect, one or more non-transitory computer readable media store instructions that are executable by one or more processors configured to perform operations including receiving usage data representing a plurality of operations performed by a computing system, the usage data specifying, for each operation of the plurality, at least one entity of an infrastructure of the computing system that is related to that operation. The operations include retrieving the data structure including vertices and edges, where each vertex of the data structure represents an entity of the infrastructure, and where each edge of the data structure represents a relationship between entities of the infrastructure. The operations include analyzing the usage data to determine a correlation between a first operation specifying a first entity and a second operation specifying a second entity. The operations include generating an edge between the first entity specified by the first operation and the second entity specified by the second operation; and generating event data including usage data specifying either the first entity or the second entity, where a format of the event data corresponds to positions of the first entity and the second entity in the data structure.

In some implementations, the event data is generated in response to receiving a receiving a query specifying at least one of the first entity and the second entity. In some implementations, the format of event data comprises a ranking of portions of the usage data specifying the first entity or the second entity, the ranking derived from traversing the data structure. In some implementations, the event data comprises a root cause analysis specifying a common source of anomalies related to the computing system, and where the root cause analysis comprises traversing the data structure from the first entity or second entity.

Generally, the generated edge is associated with a confidence score that is derived from the correlation, and where the operations further comprise: updating the confidence score of the generated edge of the data structure in response to receiving additional usage data representing additional operations that specify the first entity, the second entity, or both the first and second entities.

In some implementations, the operations further include selecting a given vertex representing a given entity of the infrastructure and generating a cluster of entities including the given entity by traversing the data structure along the vertices and the edges, starting with the given vertex, where an additional entity is added to the cluster of entities when the confidence score associated with an edge connecting a vertex representing the additional entity to another vertex representing a clustered entity exceeds a threshold value.

In some implementations, the confidence score of the generated edge is adjusted based on a comparison of an entity type associated with the first entity and the entity type associated with the second entity.

In some implementations, analyzing the usage data to determine the correlation comprises determining that the first operation and the second operation each occur within a threshold period of time with respect to each other. In some implementations, analyzing the usage data to determine the correlation comprises determining that the first operation and the second operation were caused by a common user. In some implementations, analyzing the usage data to determine the correlation comprises analyzing network traffic to determine that the first operation is upstream of the second operation.

In some implementations, the usage data specifies a new entity that is not represented in the data structure, and where the operations further include adding a new vertex representing the new entity to the data structure; determining that an existing entity is related to the new entity based on a relationship that is explicitly specified in the usage data; and adding a new edge relating the new vertex to an existing vertex of the data structure representing the existing entity.

In some implementations, the operations include determining, based on the usage data, that a given entity of the infrastructure is not related to any operations of the plurality of operations for longer than a threshold period of time; and removing, in response to the determining, a given vertex representing the given entity from the data structure.

Generally, the entity comprises one of a performance metric of the computing system, an alert specifying behavior of the computing system, a service responsive to a request received by the computing system, a team representing a plurality of users of the computing system, a tag, or a dashboard configured to report data about the computing system. Generally, the usage data includes at least one of a data log, an application trace, an alert, and a performance metric of the computing system.

In an aspect, one or more non-transitory computer readable media store instructions that are executable by one or more processors configured to perform operations including receiving a request for event data that represents operations of a computing system that are related to a given entity of an infrastructure of the computing system. In an aspect, the operations include retrieving a data structure including vertices and edges, where each vertex of the data structure represents an entity of the infrastructure and where each edge of the data structure represents a relationship between entities of the infrastructure, where at least one edge represents a determined relationship between a first entity and a second entity based on an analysis of first operations specifying the first entity and second operations specifying the second entity. In an aspect, the operations include selecting a given vertex representing the given entity of the infrastructure, generating a set of entities including the given entity by traversing the data structure along the vertices and the edges, starting with the given vertex; retrieving usage data for each entity of the set, generating the event data by ordering the usage data in an order that is derived from traversing the data structure, and outputting the event data.

In some implementations, the operations further include providing a prediction of a future anomaly of the computing system, the prediction derived from the order of the usage data in the event data. In some implementations, the event data comprises a root-cause analysis for anomalies related to the computing system, the root cause analysis specifying a common source for the anomalies.

In some implementations, the operations further comprise generating a message including at least one suggestion for remediation of at least one anomaly of the computing system. Generally, an additional entity is added to the set of entities when a confidence score associated with an edge connecting a vertex representing the additional entity to another vertex representing an entity of the set exceeds a threshold value.

Generally, the entity comprises one of a performance metric of the computing system, an alert specifying behavior of the computing system, a service responsive to a request received by the computing system, a team representing a plurality of users of the computing system, a tag, or a dashboard configured to report data about the computing system.

The details of one or more embodiments are set forth in the accompanying drawings and the description below. Other features and advantages will be apparent from the description and drawings, and from the claims.

DETAILED DESCRIPTION

Figure 1:
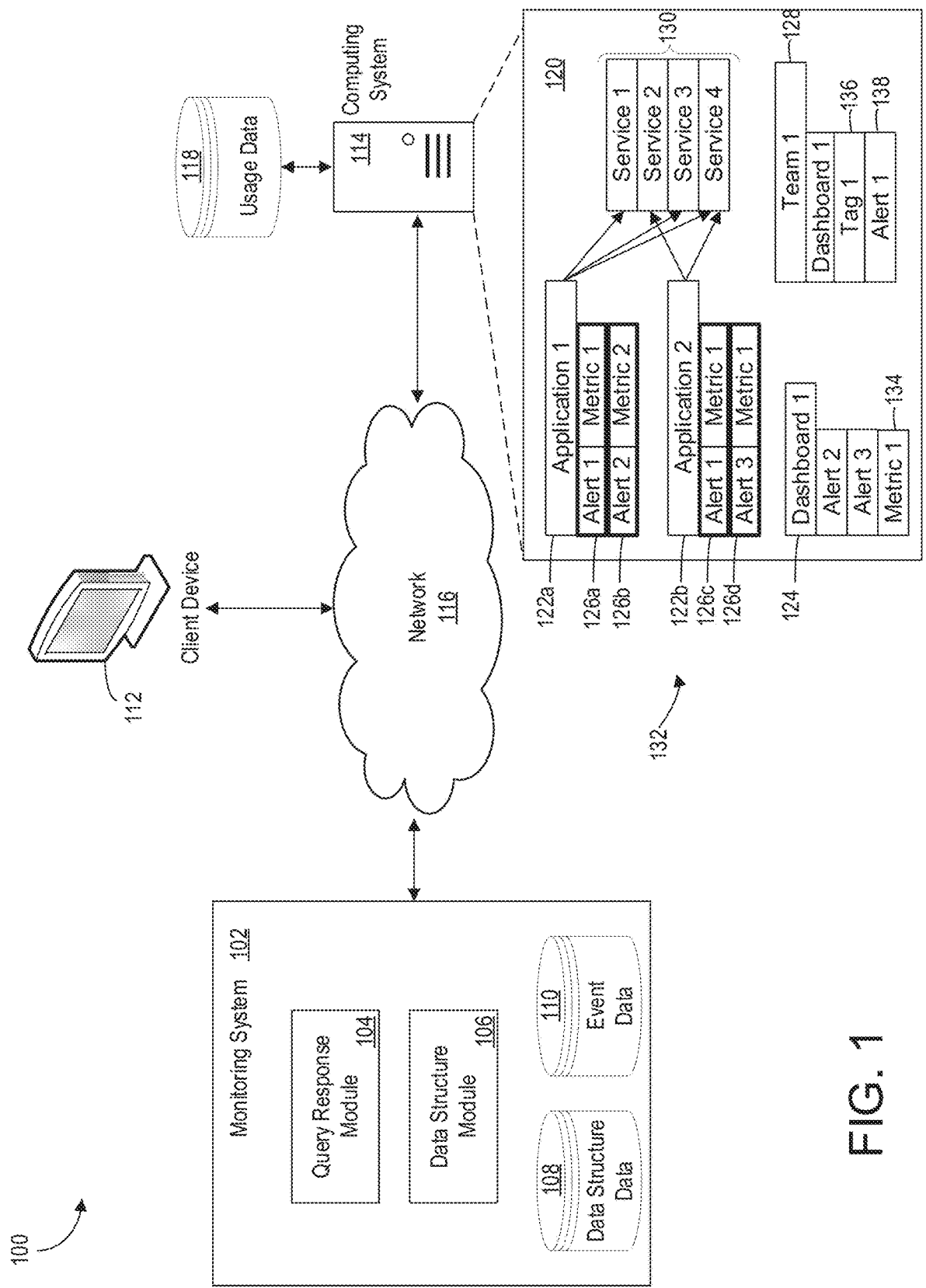
FIG. 1 is a block diagram of an example computing environment for providing a data structure that identifies relationships between entities of an infrastructure by a monitoring system.

A monitoring system described in this document generates structured data that represents identified relationships among systems (e.g., computing systems, applications, logic modules, etc.) or portions of systems of high-scale network. The monitoring system analyzes usage data generated by the systems during operations of the systems. For example, the systems can generate log data (or other similar data) when responding to requests for data from other computing systems or applications. Generally, in the network infrastructure, each system is related to one or more entities (alerts, services, teams, monitoring dashboards, performance metrics, tags, etc.) that operate in the network infrastructure. An IT network infrastructure includes a plurality of the entities related to systems configured to communicate with one another. As systems within the high-scale network interact with one another, the entities related to each system can also be active, and thus related to one another. The monitoring system described herein is configured to determine which entities are related (e.g., correlate, depend, etc.) to one another during operations of the systems of the high-scale network. When a particular entity reports an anomaly, the monitoring system can provide data from other entities which are more closely related (e.g., within a threshold proximity) to the particular entity. The monitoring system thus provides comprehensive, relevant data for diagnosing a cause of the anomalies in the network infrastructure and debugging those anomalies. The comprehensive data provided by the monitoring system would otherwise be difficult for a user to extract from among the data generated by the network infrastructure because it would not be apparent that such data would be relevant to the particular entity.

To accomplish this, the monitoring system receives a data stream including usage data (e.g., log messages, performance metrics, application traces, event data, and so forth) generated for one or more of the systems. The monitoring system generates, from the usage data, a structured representation of the entities of the network infrastructure. The structured representation includes structured data that can be queried by at least one computing system for providing information indicating relationships (e.g., dependencies, correlations, etc.) among entities of the network infrastructure. An output can be provided which shows the relationships between the entities.

However, high-scale networks generally evolve over time. Typically, many systems of the network infrastructure are added, removed, and updated over time. The network infrastructure can also be complex. For example, applications of the network infrastructure can be run as distributed across many computing systems, and can be updated frequently by many different users/administrators of the IT network infrastructure. The application can be updated in an inconsistent manner across computing systems and over time, such as modules with different naming conventions, varying functions, different architectures, and so forth. For example, microservice architectures can be introduced inconsistently, and ephemeral containers can be added and managed using automation and orchestration. Such a highly dynamic environment can be difficult to track, and corresponding infrastructure diagrams that represent the structure of the network infrastructure can be difficult for system administrators to maintain.

To solve this problem, the monitoring system automatically updates the data structure to respond to detected changes in the network infrastructure. The monitoring system is configured to detect changes in the network infrastructure and update the data structure to represent the updated network infrastructure. The monitoring system monitors usage data generated by the systems of the high-scale network. The usage data generally specifies one or more of the entities. The monitoring system associates the one or more of the entities with that system. The monitoring system also relates the entities (if more than one) to each other in the data structure.

In response to receiving a query requesting usage data related to an entity (e.g., a service), the monitoring system determines which other entities of the network infrastructure are related by traversing the data structure. The monitoring system can output data entries, such as log messages (or other data, such as identifying data) related to each of the identified entities to the user. The user thus receives the most relevant data about related entities in the network infrastructure, which can provide context during debugging processes and facilitate identification of a cause of an anomaly. Thus, the data structure generated by the monitoring system facilitates debugging by identifying and providing data about the network infrastructure that would otherwise be difficult to find among all the data generated by the network infrastructure, even as the network infrastructure is changed.

FIG. 1 is a diagram of an example computing environment 100 for providing a data structure that identifies relationships between entities of a network infrastructure 120. The computing environment 100 includes a monitoring system 102 configured to receive a data stream from a computing system 114. The computing environment 100 includes a client device 112 configured to send one or more requests for data from the monitoring system 102 and/or the computing system 114. The client device 112 can access the monitoring system 102 over a network 116 (e.g., the Internet). The monitoring system 102 is configured to receive a data stream that is generated by the computing system 114. The monitoring system 102 transforms the data stream into structured data, including metadata. The data structure that is generated by the monitoring system 102 can be accessed by the client device 112 (e.g., in response to a user query) and presented to a user by a user interface (not shown) of the client device. Each component of the computing environment is subsequently described in additional detail.

The computing system 114 includes a network infrastructure 120. The network infrastructure 120 includes a plurality of entities 132. Generally, the entities 132 that are configured to perform IT operations for the high-scale network, such as data processing, search and retrieval of data, or any number of applications. The network infrastructure 120 shown is a simplified example to represent different entities 132 of the network infrastructure 120 and how they can be related to one another. In this example, the computing system 114 is a particular system that can be networked (e.g., over network 116) to other similar computing systems to form the high-scale network. The network infrastructure 120 can be distributed across the computing systems of the high-scale network. For example, the network infrastructure 120 that is shown can be a portion of the total network infrastructure including only some of the entities 132 of the network infrastructure. In this case, the entities 132 of the network infrastructure 120 can be related to other entities (not shown) of other computing systems. In some implementations, the network infrastructure 120 is confined to a particular computing system 114.

The entities 132 of the network infrastructure 120 are configured to perform any number of IT operations to facilitate operation of the high-scale network. For example, the network infrastructure 120 can be configured to alert users (or teams of users) to anomalies in the high-scale network, such as with computing system 114. The operations can include data processing, search and retrieval of data, data presentation, and so forth. For example, the entities 132 can be related to one or more applications 122a, 122b of the computing system 114.

Examples of entities 132 include dashboards 124, teams 128, services 130, metrics 134 (e.g., performance metric data), tags 136, and alerts 138. A dashboard 124 includes an interface that collects monitored data from the network infrastructure 120. Generally, the dashboard is configured to prepare the data for presentation to a user. For example, the dashboard 124 can include a user interface in which specified data are reported. The dashboard 124 can be configurable to present different data about the applications 122a, 122b and one or more of the entities 132.

A team 128 includes a set of identifiers that point to particular users of the network infrastructure 120. Members of a team 128 receive a particular suite of alerts, performance data, etc. to facilitate monitoring and maintenance of the high-scale network. A team 128 can be assigned to monitor and maintain one or more entities 132, such as by using dashboards 124.

A service 130 includes executable logic that is configured to respond to requests to perform a specific task. For example, a service can include a processing engine that performs a calculation, fetches data, and so forth. Generally, the applications 122a, 122b are configured send requests to the services 130. The services 130 can receive requests from different applications 122a, 122b (or other entities 132), queue and prioritize the requests (if necessary), and respond to the requests.

Metrics 134 include data that describes operations of the applications 122a, 122b being executed by the computing system 114. Generally, metrics can include performance data about the operations, such as response latency, number of requests received, etc. The metrics 134 can be reported to dashboards 124 to provide a representation of the operational health of the computing system 114 and the high-scale network overall. Generally, metrics are related to statistical performance data, but can include other data that informs the user about the operations.

An alert 138 includes data describing what operations are occurring for the applications 122a, 122b of the computing system 114. For example, an alert 138 can be generated to flag an operation or action of an application 122a, 122b or another of the entities 132. For example, alerts 138 can include error messages that are generated when the applications 122a, 122b reach a particular state or execute (or fail to execute) a particular operation. Alerts can also include indications that a threshold has been surpassed (e.g., a threshold response latency), that an operation as triggered, and so forth.

A tag 136 includes an identifier that can identify another entity, system, etc. for an operation of the application 122a, 122b. For example, a tag 136 can identify a source of data (e.g., a source tag), a target for data (e.g., a target tag), and so forth.

The applications 122a, 122b include executable instructions for performing operations for the high-scale network. The applications 122a, 122b can include any operations that the computing system 114 can perform. The applications 122a, 122b can include cloud computing operations, data farming operations, data management operations, and so forth. These applications 122a, 122b are supported by the network infrastructure 120, which are configured to provide the monitoring system 102 with data to monitor applications 122a, 122b, debug problems with applications 122a, 122b, and so forth.

The entities 132 are related to the applications 122a, 122b, and to one another in the network infrastructure 120. In some implementations, these relationships can be explicit. For example, an application 122a can have alerts such as Alert 1 and Alert 2 that are generated in response an action occurring in the application. In this example, Alert 1 and Alert 2 are explicitly related to application 122a. This information is captured by the monitoring system 102 for generating the data structure, as subsequently described. In another example, Alert 1 and Metric 1 are related by explicit containment 126a defined in the computing system 114. For example, containment 126a can specify that Alert 1 is related to Metric 1 (e.g., if Metric 1 exceeds a threshold). That containment 126a can be configured to notify a particular team 128. Applications 122a, 122b can each be associated with various containments 126a, 126b, 126c, and 126d.

The network infrastructure 120 of FIG. 1 includes examples of entities 132 that are interacting with applications 122a, 122b and with each other. Application 122a is configured to request services Service 1, Service 3, and Service 4, while application 122b is configured to request Service 2 and Service 4. Additionally, application 122a is explicitly related to Alert 1 in a relationship with Metric 1, and Alert 2 in relationship with Metric 2. Application 122*b* is related to Alert 1 in a relationship with Metric 3, and Alert 3 in a relationship with Metric 1. Dashboard 1 is associated with Alert 2, Alert 3, and Metric 1. This can mean that Dashboard 1 is configured to report data of Alert 2, Alert 3, and Metric 1 to users of Dashboard 1. Team 1 is assigned to monitor Dashboard 1, Tag 1, and Alert 1. Tag 1 and Alert 1 can be monitored using other Dashboards.

While some of these relationships are explicit, as previously described, others are indirect. An indirect relationship can include any relationship that is not explicitly defined in the usage data. For example, a service (e.g., Service 1) that is requested by application 122*a* can repeatedly trigger an alert (e.g., Alert 2) monitored by a team (e.g., Team 1) using a dashboard (e.g., Dashboard 1). The monitoring system 102, as subsequently described, is configured to connect the team to the particular service by analyzing particular usage data generated by the computing system 114 that reference those entities. Furthermore, as applications 122*a*, 122*b* and the network infrastructure 120 are updated, relationships can increase or decrease in relevance, be added, removed, and so forth. The monitoring system 102 generates the data structure to track these changes based on the data stream received from the computing system 114.

A data stream includes a string of characters. The data stream can be configured to be intermittently (or in some cases, continuously) sent from the computing system 114 to the monitoring system 102 for ingestion by the monitoring system 102. The monitoring system 102 receives the data stream, ingests the data stream (e.g., processes the characters of the data stream), determines relationships between entities of the network infrastructure 120, and generates or updates a data structure to represent the determined relationships. While the data stream can be a continuous string of characters, the data stream is generally segmented into data entries (e.g., log messages) or other data elements (e.g., data files). The computing system 114 sends usage data 118 to the monitoring system 102. In some implementations, because usage data 118 can be received by the monitoring system 102 as a data stream, the monitoring system can use portions of the usage data (e.g., a time stamp or syntax characters) to determine when a first data entry is complete and a second data entry commences.

The monitoring system 102 generally includes at least one computing system that is configured to monitor computing operations of a computer or computer network. The monitoring system 102 can monitor the operations of a computing system (e.g., computing system 114) that generates a data stream describing operations of that computing system 114. For example, the monitoring system 102 can be configured to monitor how the computing system 114 responds to requests for data from one or more services of the computing system 114, how the computing system 114 processes data, what errors occur during this processing, and so forth. Generally, the operations can include any function performed by the computing system 114. In some implementations, the computing system 114 includes the monitoring system 102. For example, the monitoring system 102 can include applications 122*a*, 122*b* that are installed on the computing system 114. In some implementations, the monitoring system 102 is configured to monitor the operations of a plurality of computing systems that are similar to computing system 114. In such a configuration, the monitoring system 102 can identify the particular source of usage data 118 by a host name or other identifier associated with the usage data. The monitoring system 102 receives the data stream from the computing system 114, generates and updates a data structure describing the network infrastructure 120, and responds to queries about the operational behavior of the computing system 114.

The monitoring system 102 includes a query response module 104 and a data structure module 106 for processing data received form the computing system 114, such as usage data 118. Generally, the query response module 104 is configured to respond to queries (e.g., from the client device 112) about the network infrastructure 120. For example, a user (e.g., though client device 112) can submit a query about a particular service (e.g., Service 2). In this example, the query response module 104 determines, by traversing the data structure generated by the data structure module 106, which of the entities 132 are related to Service 2. The query response module 104 then generates a response to the query, such as by gathering the data related to the identified entities 132 and packaging the gathered data for display on a user interface. The functions of the query response module 104 are described subsequently in detail, such as in relation to FIGS. 2-4. The data that is configured for being output to the client device 112 can be stored as event data 110. In some implementations, the event data 110 can be prepared in advance of a query to reduce a latency of responding to queries from the client device 112.

The data structure module 106 is configured to receive data from the computing system 114 about the network infrastructure 120 and the entities 132 and generate and/or update a data structure that represents the network infrastructure 120. The data structure generally comprises a graph of nodes and edges, and is subsequently described in detail in relation to FIGS. 2-4. The data structure module 106 generally is configured to update the data structure either continually or intermittently over time as new data is received from the computing system 114. These updates can include generating new nodes (also called vertices) to represent new entities 132 that are added to the network infrastructure 120. The updates can include generating or removing edges representing the relationships between the entities 132 as the new data received from the computing system 114 are analyzed. The particular aspects of data structure generation and updating are subsequently described in relation to FIGS. 2-4. The data structure can be stored by the monitoring system 102 as data structure data 108. The As described above, the computing system 114 is communicatively connected to the client device 112 and the monitoring system 102 through a network 116. The computing system 114 can include, but are not limited to, e.g., one or more server computers, end devices, etc. The computing system 114 can be configured to transmit, receive, and/or process data. For instance, in some cases, the computing system 114 can be a web server configured to receive and store content (e.g., web content, such as a web page), and make the content available to one or more other computer systems (e.g., client device 112). Upon receiving a request (e.g., from the client device 112), the computing system 114 can retrieve the requested content and transmit the content to the requesting computer system to fulfill the request. In some implementations the computing system 114 stores a log indicating that the computing system has performed an action (e.g., responded to such a request). The logs can be stored as usage data 118. In some cases, the computing system 114 can be owned, operated, and/or maintained by parties different from those that own, operate, and/or maintain the computing system 102. In some implementations, the computing system 114 and the monitoring system 102 can be combined into a common hardware device.

The monitoring system 102 is also communicatively connected to one or more client devices 112 through the network 116. Each client device 112 includes a respective user interface (not shown). Users can interact with the user interface to view reports generated by the monitoring system 102 (e.g., lists of clusters). Users can also interact with the user interface to transmit data to other devices (e.g., to the monitoring system 102 and the computing system 114). Users can interact with the user interface to issue commands (e.g., to the monitoring system 102, and to the computing system 114). In some implementations, a user can install a software application onto a client device 112 in order to facilitate performance of these tasks.

The client device 112 can be any electronic device that is used by a user to view, process, transmit and receive data. Examples of the client device 112 include computers (such as desktop computers, notebook computers, server systems, etc.), mobile computing devices (such as cellular phones, smartphones, tablets, personal data assistants, notebook computers with networking capability), and other computing devices capable of transmitting and receiving data from the network 116. The client device 112 can include devices that operate using one or more operating system (e.g., Microsoft Windows, Apple OSX, Linux, Unix, Android, Apple iOS, etc.) and/or architectures (e.g., x86, PowerPC, ARM, etc.) In some implementations, the client device 112 need not be located locally with respect to the rest of the environment 100, and can be located in one or more remote physical locations.

The network 116 can be any communications network through which data can be transferred and shared. For example, the network 116 can be a local area network (LAN) or a wide-area network (WAN), such as the Internet. The network 116 can be implemented using various networking interfaces, for instance wireless networking interfaces (such as Wi-Fi, Bluetooth, or infrared) or wired networking interfaces (such as Ethernet or serial connection). The network 116 also can include combinations of more than one network, and can be implemented using one or more networking interfaces.

The monitoring system 102 and the computing system 114 are each illustrated as a respective single component. However, in practice, each can be implemented on one or more computing devices. A monitoring system 102 or a computing system 114 can be, for instance, a single computing device that is connected to the network 116. In some implementations, a monitoring system 102 or a computing system 114 can include multiple computing devices that are connected to the network 116. For instance, the monitoring system 102 can include several computing devices, and the parsing module 104 and the clustering module 106 can be distributed on one or more of these computing devices. In some implementations, a monitoring system 102 or a computing system 114 need not be located locally to the rest of the environment 100, and portions of the monitoring system 102 or the computing system 114 can be located in one or more remote physical locations.

Figure 2:
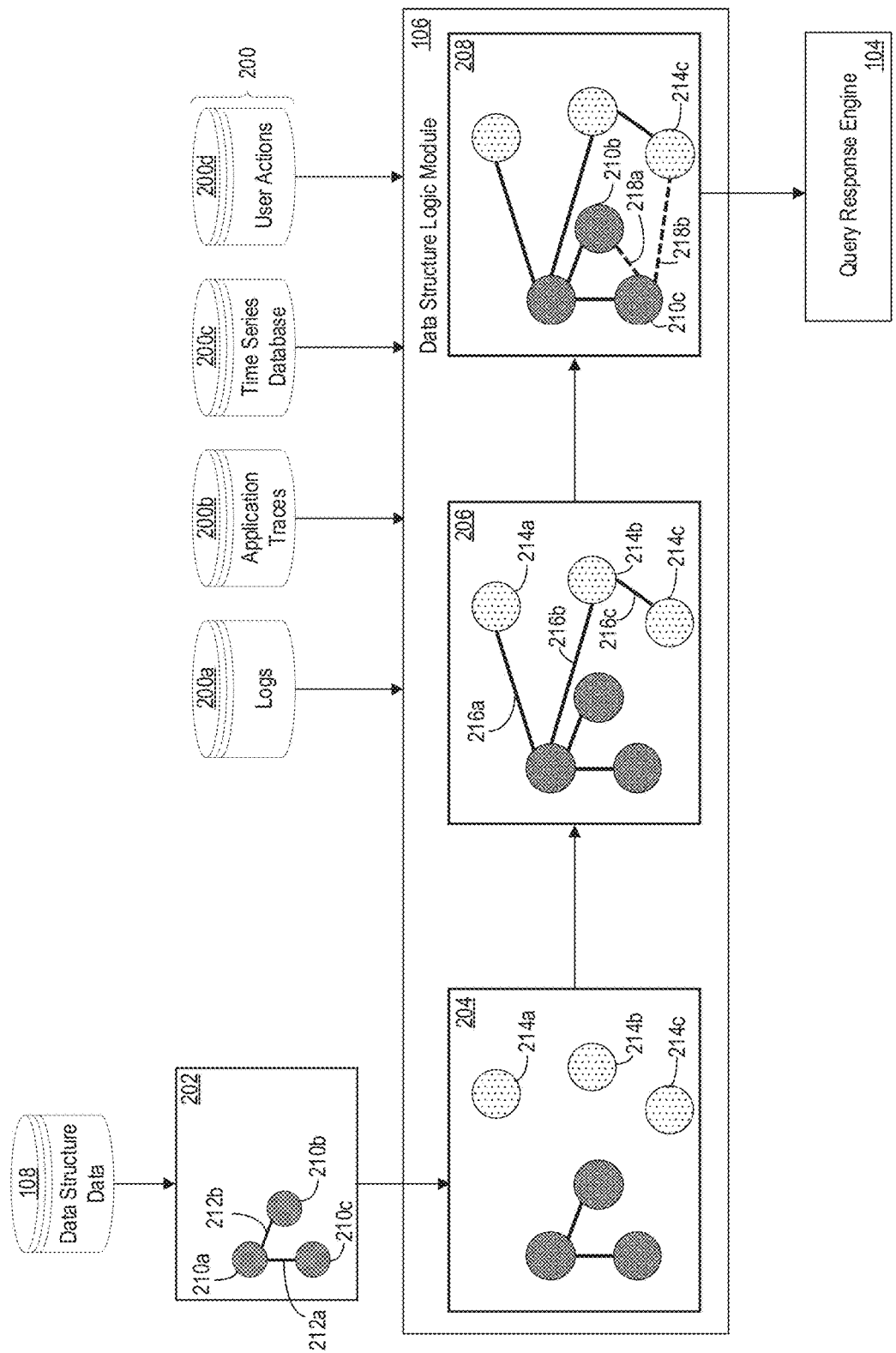
FIG. 2 shows a block diagram of an example process for generating and updating a data structure by the monitoring system.

FIG. 2 shows a block diagram of an example process for generating and updating a data structure by the monitoring system 102. As previously described, the monitoring system 102 receives data from the computing system 114 that describes operations of the computing system 114. The data can be generated from one or more sources 200. The sources shown in FIG. 2 are non-exhaustive, but represent the types of data that can be used to generate the data structure. The data from the sources 200 can be in the form of usage data 118, as described previously in relation to FIG. 1. The sources 200 can include logs 200*a*, application traces 200*b*, time series database data 200*c*, and user actions data 200*d*. The data structure module 106 of the monitoring system 102 receives the data from the sources 200 and generates or updates a data structure representing the network infrastructure 120 in response.

Generally, the data structure that the data structure module 106 generates includes a graph of nodes (vertices) and edges. The nodes 210 (represented by nodes 210*a*, 210*b*, and 210*c* of graph 202) each represent an entity of the entities 132 of the network infrastructure 120. The edges 212 (represented by edges 212*a* and 212*b* of graph 202) represent relationships between the entities 132 represented by nodes 210*a-c*. The relationship can be explicitly defined, such as by receiving data from an application 122*a* that references an alert and a service together. For example, the data structure module 106 can receive an alert that specifies a team identifier or a service identifier, and as a result, generate an edge to relate the respective nodes of the data structure that represent those entities. While the edges can represent simple relationships, such as alert-metric, alert-team, etc., more complex edges can be generated. For example, the data structure module 106 can generate edges representing service-dashboard relationship, indicating which dashboards are most relevant to a service. In another example, the edge can represent a metric-metric relationship, showing metrics that are historically correlated. In another example, an edge represents a tag→tag relationship, showing a dependency between two tags of the network infrastructure 120. This can occur if, for example, if a host with a source tag always has a target tag for a particular target. Numerous other relationships among entities 132 are possible, and can vary from direct to indirect.

Graph 202 can be generated when the network infrastructure 120 is initialized by the monitoring system 102. For example, the graph 202 can be generated automatically or manually set up by an administrator. Graph 202 provides a starting point for representing the network infrastructure 120.

As the data structure module 106 receives additional data from the sources 200, the graph 202 is updated to better represent the network infrastructure 120. The updated graph can include nodes that represent newly added entities of the network infrastructure 120 and new edges that represent newly discovered relationships between both new and old entities 132 of the network infrastructure 120. For example, data from the sources 200 may provide additional information about existing entities that are already represented by nodes 210, and the data structure module 106 can update the relationships represented in the graph 202 among those nodes.

Once the data structure module 106 receives additional data from the sources 200, the data structure module 106 can update the graph 202 as now described. The data structure module 106 analyzes the data of the sources 200 to determine whether any new entities 132 have been identified for the network infrastructure 120. In the example of FIG. 2, three new entities 132 are found by the data structure module 106. In graph 204, the data structure module 106 generates three new nodes 214*a*, 214*b*, and 214*c*, each respectively representing a newly discovered entity of the network infrastructure 120.

Entities 132 can be discovered in the network infrastructure 120 when they are referenced in the data of sources 200.

For example, if a new alert is received, the data structure module 106 generates a corresponding node for that alert. If a previously unknown dashboard is referenced, the data structure module 106 generates a new node representing that dashboard. If a new service is identified (e.g., in an alert), a node representing the service is generated. A new edge is generated that relates the node representing the new service with the alert that identified it. In some implementations, the new entities can be explicitly tagged as such if generated through the monitoring system 102. In situations where non-standard tags are used, the data structure module 106 can infer tag names based on the structure of the data entry including the tag (or using other contextual data).

In graph 204, the nodes 214a-c represent discovered entities of the network infrastructure 120 that were not previously represented in graph 202. The data structure module 106 generates the nodes 214a-214c. Once the nodes 214 are generated, the data structure module 106 determines how they are related to one another and to the prior nodes 210. The data structure module 106 can analyze the data from the sources 200 to determine whether new or known entities 132 are correlated historically, whether new explicit relationships are defined between existing or newly discovered entities, and so forth. In some implementations, a threshold can be set for correlation purposes. The data structure module 106 also determines whether previously generated edges have expired. For example, if either of edges 212a or 212b is based on a historical correlation between nodes 210, and the correlation is not sustained over time, one or both of the edges 212a, 212b can be removed. For example, this can occur if a test dashboard is generated and used for testing purposes, and then that dashboard is not used for a long period of time. In this case, edges that are generated in response to the testing can be removed after an amount of time has passed and new data does not indicate the entities are still related.

The data structure module 106 generates graph 206, which shows newly generated edges 216a, 216b, and 216c between the nodes 210 and 214. In this example, edges 212a, 212b remain. New edges 216a-c relate the newly generated nodes 214 with the existing nodes 210 and to one another. The edges 216a-c generated by the data structure module 106 can be generated when there is a high level of confidence (e.g., above a threshold confidence) that the entities represented by the respective nodes are related.

The data structure module 106 can generate different types of edges to reflect respectively different types of relationships between and among the entities 132 of the network infrastructure 120. For example, the relationships can indicate that there is a dependency, a historical correlation, an explicit containment, and so forth. In some implementations, each edge can be associated with a confidence score. The confidence score can reflect the probability (or some function of a probability) that entities represented by the nodes connected by the edge associated with the confidence score are actually related. Entities that are distantly related to one another (but above a minimum threshold) can be assigned relatively lower confidence scores for the edge relating them, relative to edges representing explicit relationships. In an example, a correlation can be generated when alerts contemporaneously trigger. The query response module 104 determines whether this is a pattern over time, and if so, generates an edge relating the two nodes representing those alerts. In some implementations, the query response module 104 generates the confidence scores for various edges in response to receiving a query about a nearby entity.

In graph 208, after analyzing the data provided in the sources 200 (or receiving additional data), the data structure module 106 generates lower confidence edges 218a and 218b. Edges 218a-b can represent indirect relationships between the respective entities of the nodes that are linked. In this example, the data structure module 106 discovers a weak relationship between existing nodes 210c and 210b that was not established before receiving additional data after initialization of the graph at graph 202. A weak relationship is also found between node 210c and new node 214c. A weak relationship includes a relationship for which there is some evidence found by the data structure module 106 below a threshold level of confidence. Conversely, a strong relationship can include a relationship that is explicitly defined in the usage data or for which a strong correlation is found (e.g., a dependency, a 1:1 correlation, etc.). Correlations can include correlations in time (e.g., alerts triggered at the same time or within a threshold time window), correlations in distance (e.g., two alters always reference the same service, but not each other), and so forth. For example, a relatively weak correlation can include two alters that reference different teams, but those teams are each assigned the same service. A relatively strong correlation can include alerts that reference the same team. These examples are illustrative and relative. In some implementations, correlations can be weaker or stronger, and the threshold changed accordingly.

The graph 208 can be updated as new data are received from the sources 200 by the data structure module 106. The graph reflects the network infrastructure 120 as the network infrastructure is updated. This provides a flexible, robust mechanism for representing the structure of the network infrastructure 120 as the network infrastructure is changed.

Figure 3:
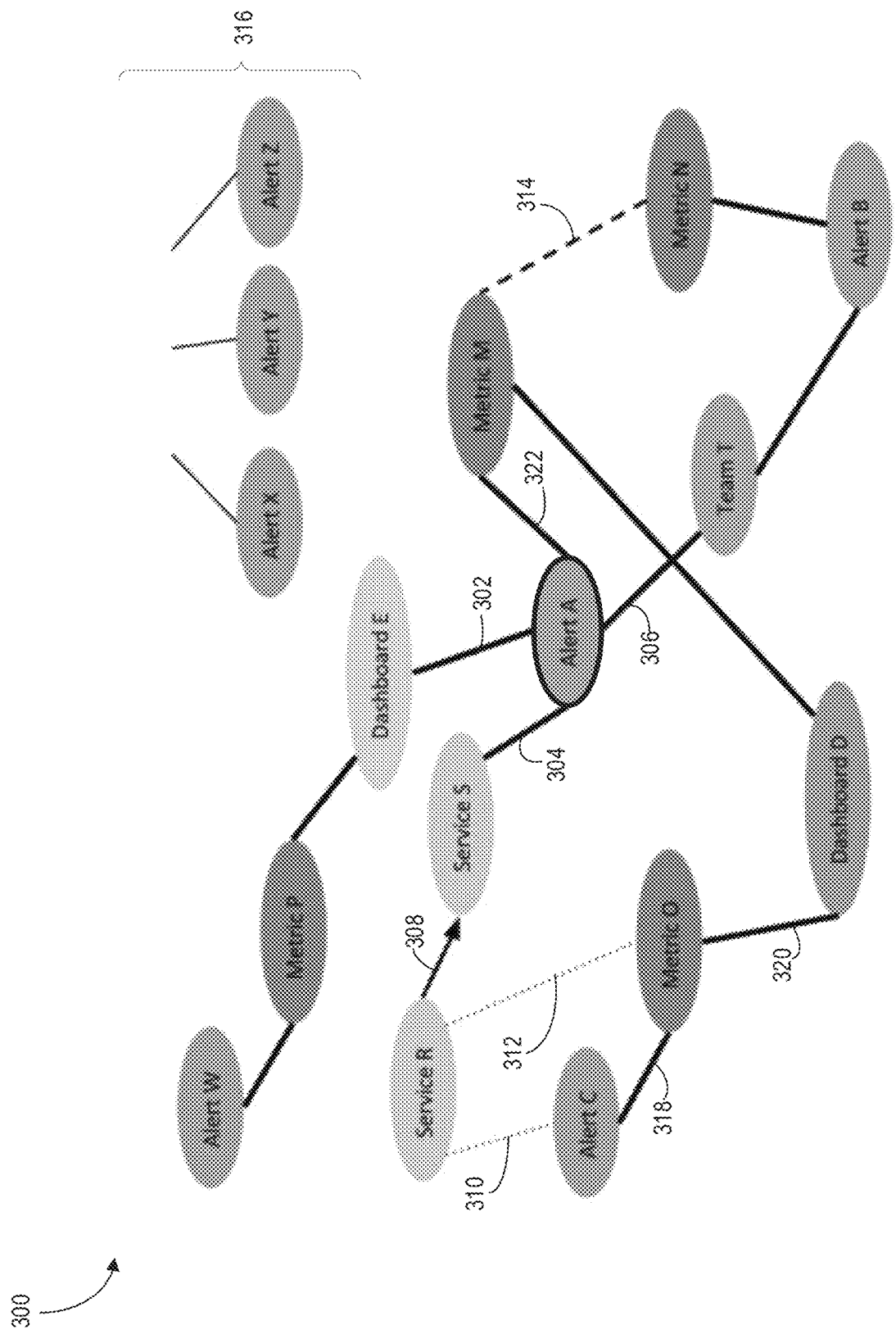
FIG. 3 shows an example of a graph data structure generated by the monitoring system.

FIG. 3 shows an example of a graph data structure 300 generated by the monitoring system. The data structure 300 (also called graph 300) is generated as described in relation to FIGS. 1-2. When the monitoring system 102 receives a query related to the network infrastructure 120, the graph 300 is traversed to identify the data that is relevant to the query. These operations are performed by the query response module 104.

A query posited to the monitoring system 102 can be configured to request data about an entity of the network infrastructure 120 or a group of the entities 132 of the network infrastructure. For example, the monitoring system 102 receives an alert, and a user might request event data (e.g., event data 110 of FIG. 1) for that alert. In an example, event data includes data for all entities related to the entity specified in the query. For example, the event data 110 can include all alerts, metrics, dashboards, etc. that are related to the alert, and all log messages (or other usage data) that reference those entities over a given period of time. The amount of data returned in the event data can be configured based on content of the query. For example, the query can specify a period of time relating to the event data 110, or a default time period can be used. The monitoring system 102 thus provides data that is relevant, such as to determining the cause of an anomaly (or for some other purpose). This is in contrast to providing a chronological report of all data for a given computing system 114, which can include unrelated data and omit relevant data for other systems. This is also in contrast to simply retuning data specifying a particular service, alert, etc. which may not provide adequate context.

The query response module 104 is configured perform one or more of the following functions. The query response module 104 can be configured for automated alerts related to entities 132 that are the most important for users. The query response module 104 can apply anomaly detection (or prediction) to those entities (e.g., metrics) that are most important for the network infrastructure 120.

The query response module 104 can provide alert clustering to respond to a plurality of alerts (or other usage data) generated by cascading failures of the computing system 114 or high-scale network. The query response module 104 clusters the alerts to a reduced amount of data (e.g., a single notification) and enhance the administrator's understanding of exactly what is going wrong at that moment in the network infrastructure 120.

The query response module 104 can provide automated root cause analysis of anomalies in the high-scale network. For example, when a system outage occurs, the query response module 104 can provide a suggestion of a root cause of the anomaly and suggest remediation actions.

The graph 300 represents a data structure generated by the data structure module 106 that has several different types of edges. For example, bold edges including edges 302, 304, and 306 include strict containment edges. For example, Alert C is related to Metric O as shown by edge 318. Metric O is included in Dashboard D, shown by edge 320. In another example, Alert A related by edge 322 to Metric M, has a tag "Service S" on it as shown by edge 304, and pages Team T as shown by edge 306.

As previously described, the data structure module 106 can generate edges between nodes without direct (e.g., explicit) containment evidence being found between the respective entities represented by those nodes. For example, the data structure module 106 generates an edge 314 between Metric M and Metric N because a historical correlation was detected, though this relationship is not 100% confirmed.

Some edges can specify a type of relationship between the entities of the nodes that they connect in the graph. For example, dependencies can be shown by directed edges. The data structure module 106 generates a directed edge 308 from Service R to Service S because Service S is detected to be downstream of Service R (e.g., by analyzing network traffic related to the two services).

As previously described, the data structure module 106 can also generate more tentative connections. In graph 300, these lower confidence relationships are shown by dotted lines 310 and 312. For example, Metric O can be "system.cpu.idle{role:R}." The data structure module 106 detects that the word "role" is often used as a synonym for "service" elsewhere in the network infrastructure 120. The data structure module 106 connects Metric O to Service R by edge 312 based on this inference. In another example, the Alert C node includes metadata (not shown) associated with the alert. In this example, the alert message includes "[R] CPU is high on R." The data structure module 106 analyzes this messages and determines that there is a relationship to Service R. Thus, the data structure module 106 generates an edge 210 to link the Alert C node to the Service R node.

The query response module 104 is configured to generate event data 110 for review using the graph 300. The query can be manually generated or automatically generated in response to an action occurring (e.g., when an alert fires over a threshold number of times, at a certain time each day, etc.).

The query response module 104 responds to the query by traversing the graph 300. Generally, the query response module 104 begins with a particular node (which may represent an entity of interest in the query) to determine what data is related to the node. For the example of graph 300, the query response module 104 determines from the query that data related to Alert A is being requested.

To respond to the query, the query response module 104 determines which other alerts are firing contemporaneously with Alert A. This is one particular way to traverse the graph; other solutions are also possible (such as finding all metrics, etc.). In this example, Alert B is connected to Alert A because they both page the same team (Team T). It might be the case that Team T is a general Site Reliability team that gets paged for almost every issue. However, the query response module 104 determines that the two metrics M and N for Alerts A and B are historically correlated (e.g., by finding edge 314). The query response module 104 thus determines that Alert B is probably related to Alert A, and thus can return Alert B.

Continuing with this example, the query response module 104 determines that Alert W is connected to Alert A through Dashboard E. However, Dashboard E's usage statistics suggest that it is never used and was perhaps just a test dashboard created by a user who randomly added some metrics to it. Though indirectly related, the relationship is too remote for including Alert W data in event data 110 for Alert A.

Further in this example, the query response module 104 determines that Alert C is connected to Alert A as their underlying metrics are both on Dashboard D. They are also connected as their associated services Service R and Service S are connected, but Alert C's relationship to Service R is low confidence (e.g., weakly related). However, the query response module 104 can combine these two pieces of information to determine that Alert C is probably related to Alert A.

Finally, the query response module 104 finds three additional alerts 316 in the graph 300, including Alerts X, Y, and Z. However, these alerts 316 are not considered related because they are distant (e.g., above a threshold distance) from Alert A in the graph 300. The query response module 104 thus reports event data 110 including data from Alerts A, B, and C (in this example) to respond to the query for alert data related to alert A.

Figure 4:
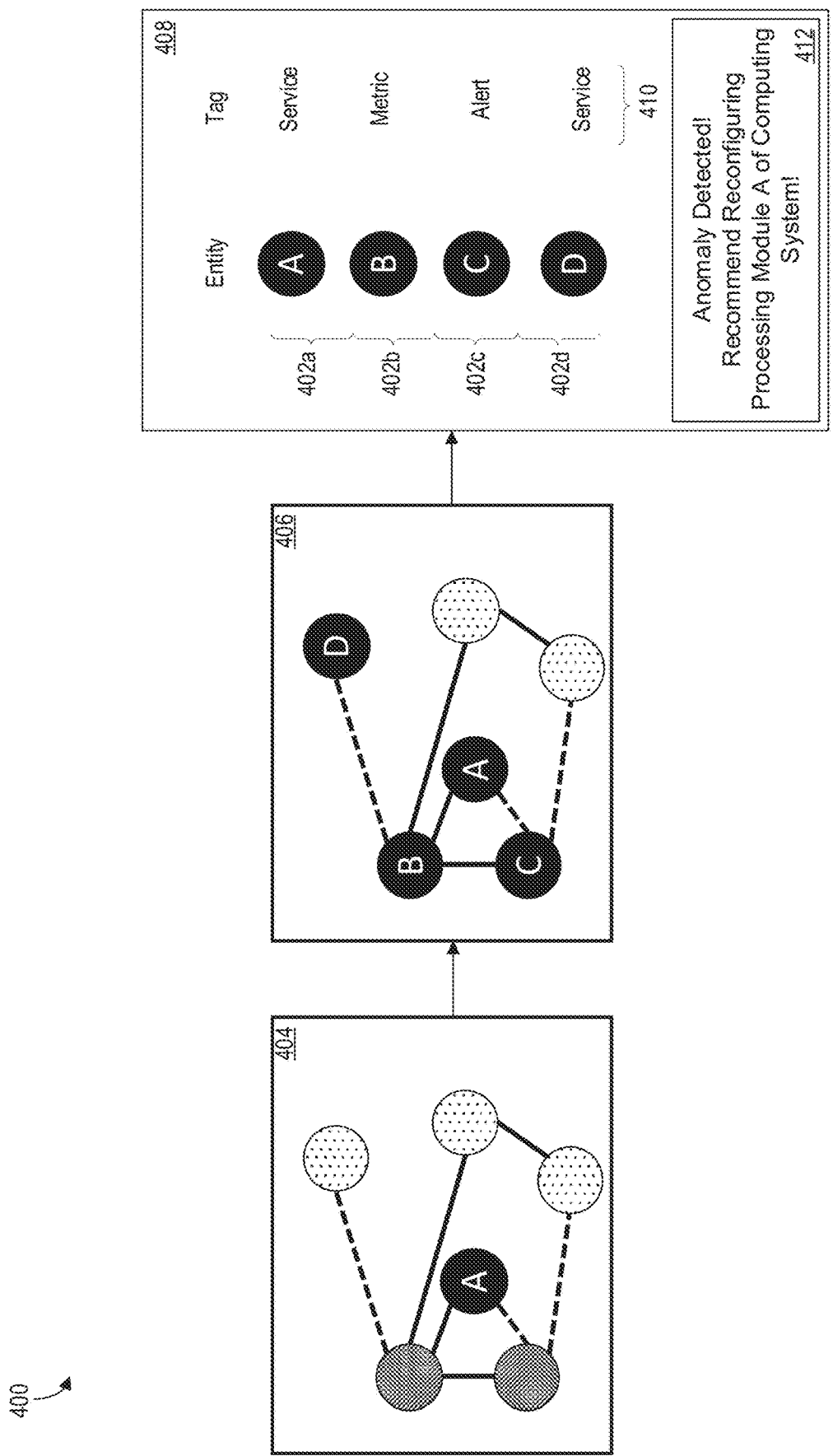
FIG. 4 shows a block diagram of an example of output generation by the monitoring system in response to a query.

FIG. 4 shows a block diagram of an example of output generation by the monitoring system 102 in response to a query. The monitoring system 102 receives a query requesting event data related to entity A. In this example, entity A includes a service. The query response module 104 traverses graph 404, starting at entity A.

At graph 406, the query response module 104 has identified four entities: A, B, C, and D. The query response module 104 determines that these four entities are related in a similar manner as described in relation to FIG. 3. Once the four entities have been identified, the query response module 104 prepares output data 408 for sending to client device 112 (or some other device).

The output data 408 can include a list of entities in a ranked order from entity 402a to 402d. In this example, entity B is ranked in the second position at 402B because it is closely related to entity A. Entity C is slightly less related, and so forth. Each of the ranked entities A-D can be associated with relevant data 410, such as content of an alert, log messages referencing the alert, identifiers of the services, and so forth. This data 410 can include associated metadata, confidence scores, or other data that can assist a user in maintaining or repairing the computing system 114 or high-scale network. In some implementations, the ranking is derived from traversing the data structure. Entities that are further away are lower ranked, and entities that are closer to the specified entity are higher ranked. The output data 408 includes event data that shows usage data (either portions or in entirety) corresponding to each of the ranked entities. The ranking can assist a user in debugging an anomaly because most relevant data is presented first. However, all related data is shown, allowing the user to determine the context of an alert, error message, etc.

The output data 408 can include a cluster of identified entities. The cluster of entities includes the entities that are within a threshold relevance to a particular entity identified in the usage data or in a user query. The cluster of entities can be used to generate event data. The event data shows usage data (either portions or in entirety) corresponding to each of the clustered entities. The ranking can assist a user in debugging an anomaly because most relevant data is presented first. However, all related data is shown, allowing the user to determine the context of an alert, error message, etc.

The output data 408 can include a remediation message 412. The message 412 can identify that an anomaly has occurred with computing system 114. The message content can be generated by analyzing the order of the entities 402a-d in the output data 408. The content of the message 412 can also depend on which entities are included in the output data 408. The message 412 can suggest corrective behavior to take, such as to reconfigure the computing system or a portion thereof, update hardware or software, redistribute processing load, deploy countermeasures for a cyberattack, or any number of remedial actions.

Figure 5:
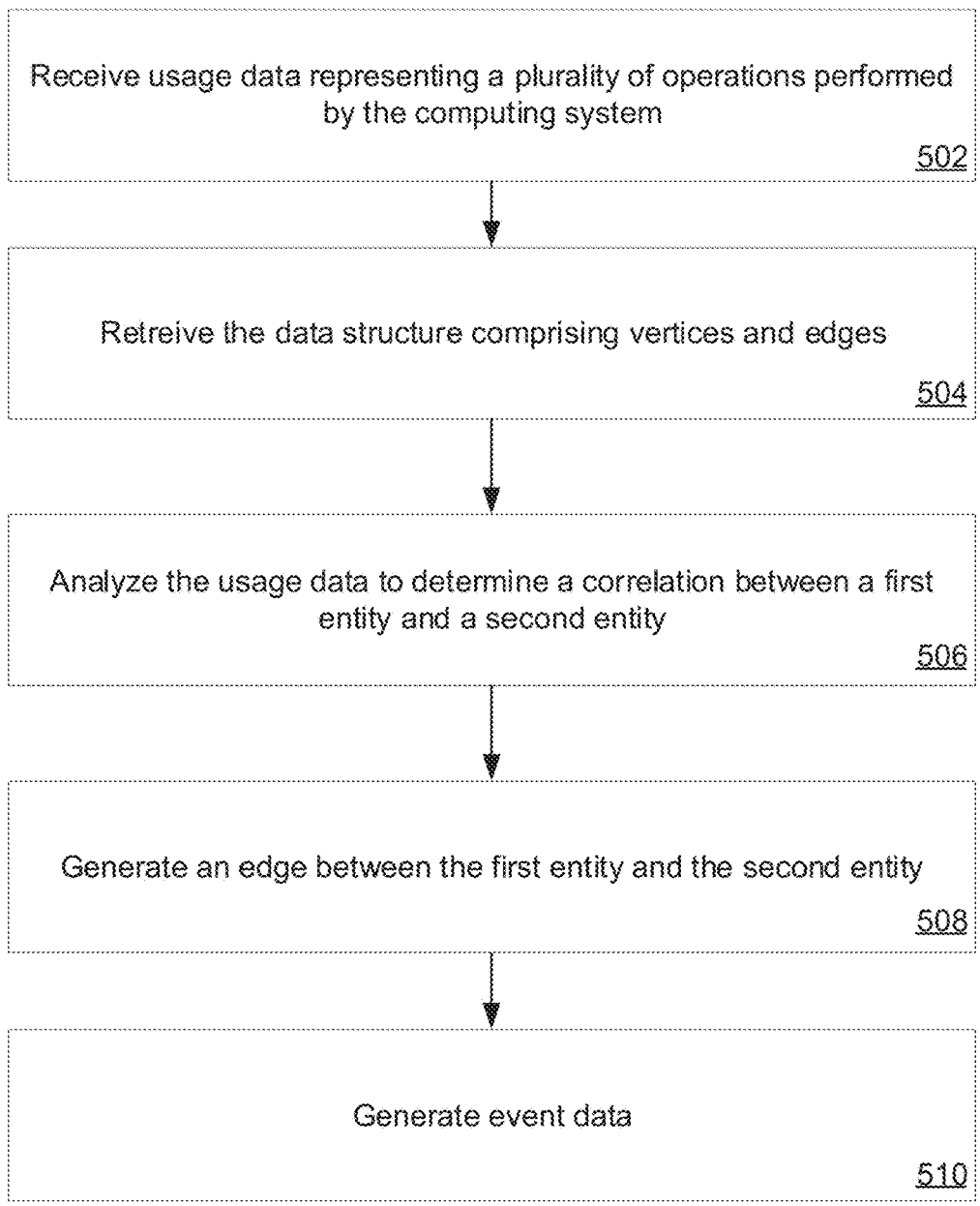
FIGS. 5-6 show flow diagrams each including an example process for providing by the monitoring system a data structure that identifies relationships between entities of an infrastructure.
Figure 6:
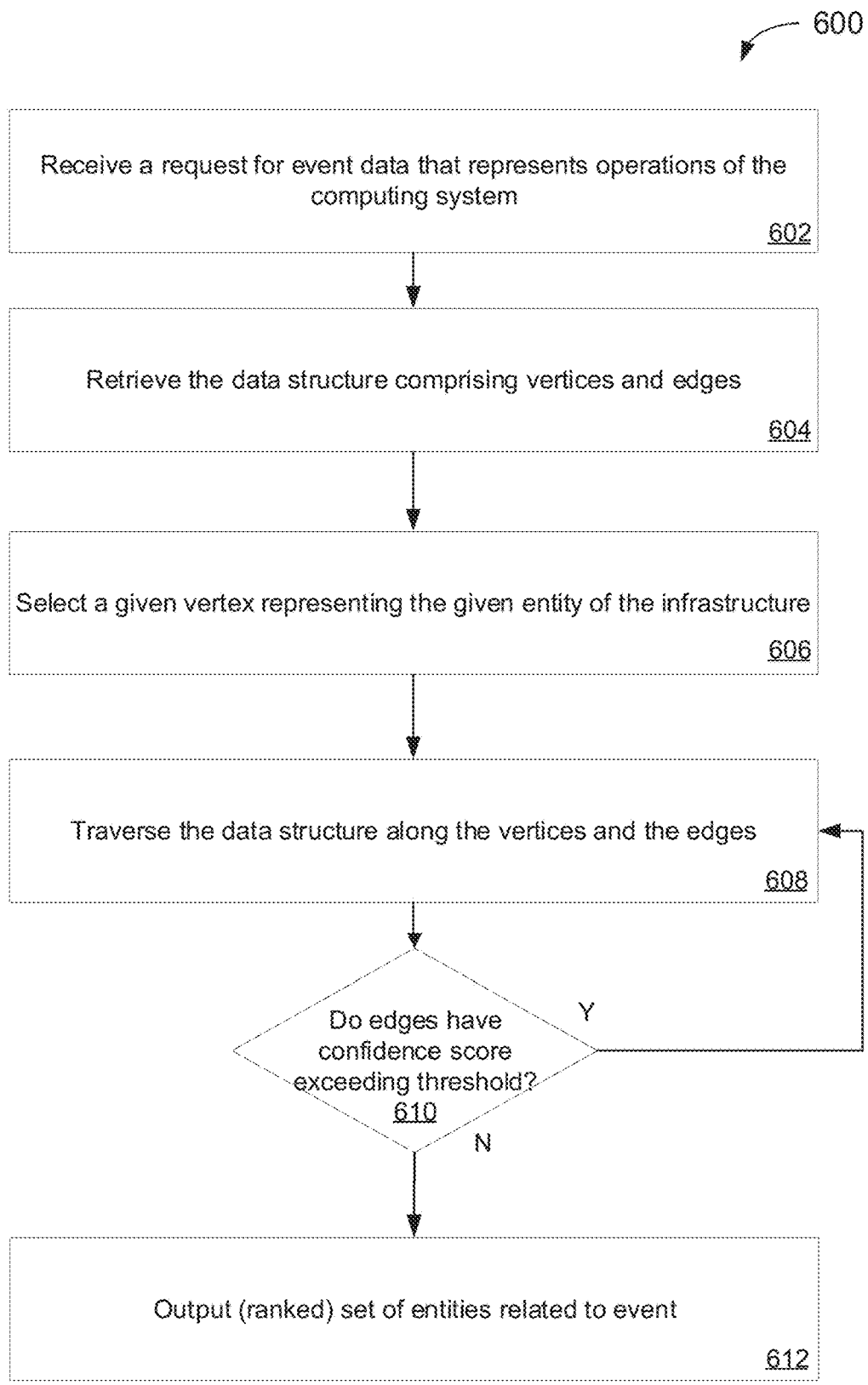

FIGS. 5-6 show flow diagrams each including an example process for providing by the monitoring system a data structure that identifies relationships between entities of an infrastructure. The processes 500-600 can be configured to be executed by a monitoring system as described in relation to FIGS. 1-4.

Turning to FIG. 5, a flow diagram shows a process 500 for providing a data structure (e.g., data structure 300 OF FIG. 3) that identifies relationships between entities of an infrastructure of a computing system (e.g., computing system 114) and that is configured to update in response to changes in the infrastructure of the computing system. The process 500 includes receiving (502) usage data representing a plurality of operations performed by the computing system. The usage data specifies, for each operation of the plurality, at least one entity of the infrastructure of the computing system that is related to that operation. For example, the usage data can include a log message that identifies a team ID, an alert, a service, and so forth.

The process 500 includes retrieving (504) the data structure, such as from the data structure data 108 of FIG. 1. Generally, the monitoring system 102 determines whether a data structure exists already for the network infrastructure 120. If no data structure exists, a new data structure is generated. Generally, once the data structure has been initialized, it is updated as the network infrastructure 120 evolves. The data structure includes vertices (nodes) and edges. Each vertex of the data structure represents an entity of the infrastructure. Each edge of the data structure represents a relationship between entities of the infrastructure.

The process 500 includes analyzing (506) the usage data to determine a correlation between a first operation specifying a first entity and a second operation specifying a second entity. The correlation can be a strong correlation of containment (e.g., an explicit correlation). In some implementations, the correlation is based on historical data. Other means for determining relationships between entities are described previously.

The process 500 includes generating (508) an edge between the first entity specified by the first operation and the second entity specified by the second operation. The process 500 includes generating (510) event data comprising usage data specifying either the first entity or the second entity. A format of the event data corresponds to positions of the first entity and the second entity in the data structure. The event data can be similar to output data 408 of FIG. 4. The format of the event data can include a list of entities (and usage data associated with each entity). The format of the event data can include a list of entities. The format can include a map of the entities. In each case, the format can show usage data for entities that are identified as related to an anomaly or series of anomalies. The format shows the data as a single event that can help a user determine that the usage data represents a single problem. The event data is generated in response to receiving a receiving a query specifying at least one of the first entity and the second entity.

In some implementations, the format of event data comprises a ranking of portions of the usage data specifying the first entity or the second entity. The ranking is derived from traversing the data structure. In some implementations, the event data includes a root cause analysis specifying a common source of anomalies related to the computing system. The root cause analysis includes traversing the data structure from the first entity or second entity to determine all related entities, and determining a common cause of the anomalies from the usage data of the group of anomalies.

In some implementations, the generated edge is associated with a confidence score that is derived from the correlation. The monitoring system 102 updates the confidence score of the generated edge of the data structure in response to receiving additional usage data representing additional operations that specify the first entity, the second entity, or both the first and second entities.

In some implementations, the monitoring system 102 selects a given vertex representing a given entity of the infrastructure and generates a cluster of entities including the given entity by traversing the data structure along the vertices and the edges, starting with the given vertex. An additional entity is added to the cluster of entities when the confidence score associated with an edge connecting a vertex representing the additional entity to another vertex representing a clustered entity exceeds a threshold value. In some implementations, the confidence score of the generated edge is adjusted based on a comparison of an entity type associated with the first entity and the entity type associated with the second entity.

In some implementations, analyzing the usage data to determine the correlation includes determining that the first operation and the second operation each occur within a threshold period of time with respect to each other. In some implementations, analyzing the usage data to determine the correlation includes determining that the first operation and the second operation were caused by a common user. In some implementations, analyzing the usage data to determine the correlation includes analyzing network traffic to determine that the first operation is upstream of the second operation.

Generally, when the usage data specifies a new entity that is not represented in the data structure, the monitoring system 102 adds a new vertex representing the new entity to the data structure, determines that an existing entity is related to the new entity based on a relationship that is explicitly specified in the usage data, and adds a new edge relating the new vertex to an existing vertex of the data structure representing the existing entity.

In an aspect, the monitoring system 102 determines, based on the usage data, that a given entity of the infrastructure is not related to any operations of the plurality of operations for longer than a threshold period of time. The monitoring system 102 then removes, in response to the determining, a given vertex representing the given entity from the data structure.

In some implementations, an entity includes one of a performance metric of the computing system, an alert specifying behavior of the computing system, a service responsive to a request received by the computing system, a team representing a plurality of users of the computing system, a tag, or a dashboard configured to report data about the computing system.

In some implementations, the usage data includes at least one of a data log, an application trace, an alert, and a performance metric of the monitoring system.

Turning to FIG. 6, a flow diagram shows a process 600 for processing data representing operations of an infrastructure of a computing system to identify relationships between entities of the infrastructure. The process 600 includes receiving (602) a request for event data that represents operations of the computing system that are related to a given entity of the infrastructure of the computing system. The request can include a user query, automated query, etc. The request can identify a single entity or a set of entities.

The process 600 includes retrieving (604) a data structure comprising vertices and edges. Each vertex of the data structure represents an entity of the network infrastructure 120. Each edge of the data structure represents a relationship between entities of the network infrastructure 120. Generally, at least one edge represents a determined relationship between a first entity and a second entity based on an analysis of first operations specifying the first entity and second operations specifying the second entity The process 600 includes selecting (606) a given vertex representing the given entity of the infrastructure and generating (608) a set of entities including the given entity by traversing the data structure along the vertices and the edges, starting with the given vertex. The traversal can be performed in a manner similar to that described in relation to FIG. 3. In some implementations, the traversal continues (610) until edges no longer have confidence scores that exceed a given threshold. The process 600 includes retrieving usage data for each entity of the set, and generating the event data by ordering the usage data in an order that is derived from traversing the data structure. The monitoring system 102 then outputs (612) the event data.

In some implementations, the monitoring system 102 provides a prediction of a future anomaly of the computing system. Generally, the prediction is derived from the order of the usage data in the event data. In some implementations, the event data includes a root cause analysis for anomalies related to the computing system. The root cause analysis specifies a common source for the anomalies.

In an aspect, the monitoring system 102 generates a message including at least one suggestion for remediation of at least one anomaly of the computing system.

In some implementations, the monitoring system 102 adds an additional entity to the set of entities when a confidence score associated with an edge connecting a vertex representing the additional entity to another vertex representing an entity of the set exceeds a threshold value.

In some implementations, an entity comprises one of a performance metric of the computing system, an alert specifying behavior of the computing system, a service responsive to a request received by the computing system, a team representing a plurality of users of the computing system, a tag, or a dashboard configured to report data about the computing system.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the monitoring system 102, the client device 112, and the computing system 114 can be implemented using digital electronic circuitry, or in computer software, firmware, or hardware, or in combinations of one or more of them. In another example, the processes 500 and 600, can be implemented using digital electronic circuitry, or in computer software, firmware, or hardware, or in combinations of one or more of them.

Some implementations described in this specification (e.g., the query response module 104, the data structure module 106, etc.) can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. In some implementations, the query response module 104 and/or the data structure module 106 comprises a data processing apparatus as described herein. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 7:
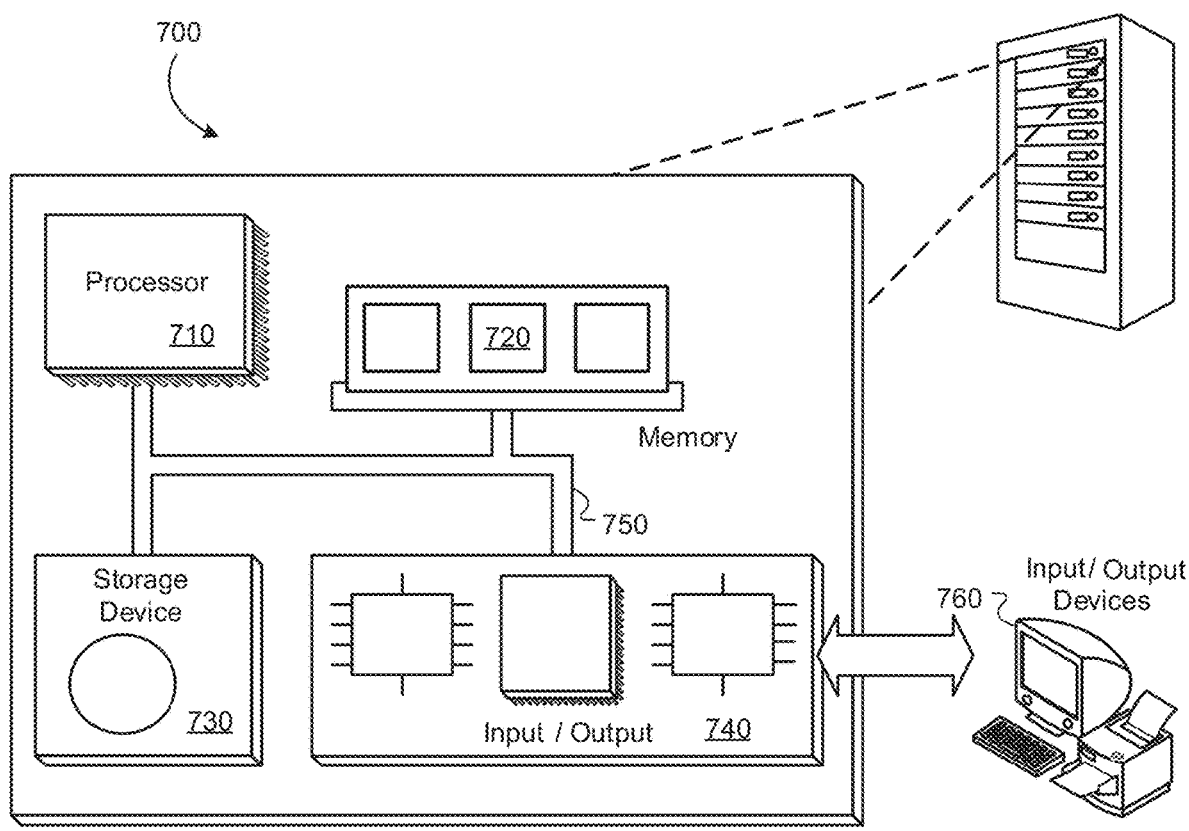
FIG. 7 is a diagram of an example computing system.

FIG. 7 shows an example computer system 700 that includes a processor 710, a memory 720, a storage device 730 and an input/output device 740. Each of the components 710, 720, 730 and 740 can be interconnected, for example, by a system bus 750. The processor 710 is capable of processing instructions for execution within the system 700. In some implementations, the processor 710 is a single-threaded processor, a multi-threaded processor, or another type of processor. The processor 710 is capable of processing instructions stored in the memory 720 or on the storage device 730. The memory 720 and the storage device 730 can store information within the system 700.

The input/output device 740 provides input/output operations for the system 700. In some implementations, the input/output device 740 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 760. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the data processing system described herein. Accordingly, other embodiments are within the scope of the following claims.

What is claimed is:

1. A method for providing a data structure that identifies relationships between entities of an infrastructure of a computing system and that is configured to update in response to changes in the infrastructure of the computing system, the method comprising:

receiving usage data representing a plurality of operations performed by the computing system, the usage data specifying, for each operation of the plurality, at least one entity of the infrastructure of the computing system that is related to that operation;

retrieving the data structure comprising vertices and edges, wherein each vertex of the data structure represents an entity of the infrastructure, and wherein each edge of the data structure represents a relationship between entities of the infrastructure;

analyzing the usage data to determine a correlation between a first operation specifying a first entity and a second operation specifying a second entity;

determining a type of the correlation between the first operation and the second operation, the type representing an explicit containment relationship between the first entity and the second entity or an indirect relationship between the first entity and the second entity;

generating an edge in the data structure between the first entity specified by the first operation and the second entity specified by the second operation, a type of the edge being based on the type of the correlation; and generating event data comprising the usage data specifying either the first entity or the second entity, wherein a format of the event data corresponds to positions of the first entity and the second entity in the data structure and the type of the edge in the data structure, wherein a message specifying a remediation is generated based on traversing the data structure in an order, and wherein the order is based on the type of the edge.

2. The method of claim 1, wherein the event data is generated in response to receiving a receiving a query specifying at least one of the first entity and the second entity.

3. The method of claim 1, wherein the format of event data comprises a ranking of portions of the usage data specifying the first entity or the second entity, the ranking derived from traversing the data structure.

4. The method of claim 1, wherein the event data comprises a root cause analysis specifying a common source of anomalies related to the computing system, and wherein the root cause analysis comprises traversing the data structure from the first entity or second entity.

5. The method of claim 1, wherein the generated edge is associated with a confidence score that is derived from the correlation, and wherein the method further comprises:
updating the confidence score of the generated edge of the data structure in response to receiving additional usage data representing additional operations that specify the first entity, the second entity, or both the first and second entities.

6. The method of claim 5, further comprising:
selecting a given vertex representing a given entity of the infrastructure; and
generating a cluster of entities including the given entity by traversing the data structure along the vertices and the edges, starting with the given vertex,
wherein an additional entity is added to the cluster of entities when the confidence score associated with an edge connecting a vertex representing the additional entity to another vertex representing a clustered entity exceeds a threshold value.

7. The method of claim 5, wherein the confidence score of the generated edge is adjusted based on a comparison of an entity type associated with the first entity and the entity type associated with the second entity.

8. The method of claim 1, wherein analyzing the usage data to determine the correlation comprises determining that the first operation and the second operation each occur within a threshold period of time with respect to each other.

9. The method of claim 1, wherein analyzing the usage data to determine the correlation comprises determining that the first operation and the second operation were caused by a common user.

10. The method of claim 1, wherein analyzing the usage data to determine the correlation comprises analyzing network traffic to determine that the first operation is upstream of the second operation.

11. The method of claim 1, wherein the usage data specifies a new entity that is not represented in the data structure, and wherein the method further comprises:
adding a new vertex representing the new entity to the data structure;
determining that an existing entity is related to the new entity based on a relationship that is explicitly specified in the usage data; and
adding a new edge relating the new vertex to an existing vertex of the data structure representing the existing entity.

12. The method of claim 1, further comprising:
determining, based on the usage data, that a given entity of the infrastructure is not related to any operations of the plurality of operations for longer than a threshold period of time; and
removing, in response to the determining, a given vertex representing the given entity from the data structure.

13. The method of claim 1, wherein the entity comprises one of a performance metric of the computing system, an alert specifying behavior of the computing system, a service responsive to a request received by the computing system, a team representing a plurality of users of the computing system, a tag, or a graphical user interface configured to report data about the computing system.

14. The method of claim 1, wherein the usage data includes at least one of a data log, an application trace, an alert, and a performance metric of the computing system.

15. A method for processing data representing operations of an infrastructure of a computing system to identify relationships between entities of the infrastructure, the method comprising:
receiving a request for event data that represents operations of the computing system that are related to a given entity of the infrastructure of the computing system;
retrieving a data structure comprising vertices and edges, wherein each vertex of the data structure represents an entity of the infrastructure and wherein each edge of the data structure represents a relationship between entities of the infrastructure,
wherein at least one edge represents a determined relationship between a first entity and a second entity based on an analysis of first operations specifying the first entity and second operations specifying the second entity;
selecting a given vertex representing the given entity of the infrastructure;
generating a set of entities including the given entity by traversing the data structure along the vertices and the edges, starting with the given vertex;
retrieving usage data for each entity of the set;
generating the event data by ordering the usage data in an order that is derived from traversing the data structure;
generating a message including a particular suggestion for remediation of at least one anomaly of the computing system based on the order of the usage data that is derived from traversing the data structure; and
outputting the event data and the message.

16. The method of claim 15, further comprising providing a prediction of a future anomaly of the computing system, the prediction derived from the order of the usage data in the event data.

17. The method of claim 15, wherein the event data comprises a root cause analysis for anomalies related to the computing system, the root cause analysis specifying a common source for the anomalies.

18. The method of claim 15, wherein an additional entity is added to the set of entities when a confidence score associated with an edge connecting a vertex representing the additional entity to another vertex representing an entity of the set exceeds a threshold value.

19. The method of claim 15, wherein the entity comprises one of a performance metric of the computing system, an alert specifying behavior of the computing system, a service responsive to a request received by the computing system, a team representing a plurality of users of the computing system, a tag, or a graphical user interface configured to report data about the computing system.

20. A system for providing a data structure that identifies relationships between entities of an infrastructure of a computing system and that is configured to update in response to changes in the infrastructure of the computing system, the computing system comprising:
- at least one processor; and
- a memory configured for storing instructions that, when executed by the at least one processor, cause the at least one processor to perform operations comprising:
  - receiving usage data representing a plurality of operations performed by the computing system, the usage data specifying, for each operation of the plurality, at least one entity of the infrastructure of the computing system that is related to that operation;
  - retrieving data structure from a data source, the data structure comprising vertices and edges, wherein each vertex of the data structure represents an entity of the infrastructure, and wherein each edge of the data structure represents a relationship between entities of the infrastructure;
  - analyzing the usage data to determine a correlation between a first operation specifying a first entity and a second operation specifying a second entity;
  - determining a type of the correlation between the first operation and the second operation, the type representing an explicit containment relationship between the first entity and the second entity or an indirect relationship between the first entity and the second entity;
  - generating an edge in the data structure between the first entity specified by the first operation and the second entity specified by the second operation, a type of the edge being based on the type of the correlation; and
  - generating event data comprising the usage data specifying either the first entity or the second entity, wherein a format of the event data corresponds to positions of the first entity and the second entity in the data structure and the type of the edge in the data structure, wherein a message specifying a remediation is generated based on traversing the data structure in an order, and wherein the order is based on the type of the edge.

21. The system of claim 20, wherein the event data is generated in response to receiving a receiving a query specifying at least one of the first entity and the second entity.

22. The system of claim 20, wherein the format of event data comprises a ranking of portions of the usage data specifying the first entity or the second entity, the ranking derived from traversing the data structure.

23. The system of claim 20, wherein the event data comprises a root cause analysis specifying a common source of anomalies related to the computing system, and wherein the root cause analysis comprises traversing the data structure from the first entity or second entity.

24. The system of claim 20, wherein the generated edge is associated with a confidence score that is derived from the correlation, and wherein the operations further comprise:
- updating the confidence score of the generated edge of the data structure in response to receiving additional usage data representing additional operations that specify the first entity, the second entity, or both the first and second entities.

25. The system of claim 24, wherein the operations further comprise:
- selecting a given vertex representing a given entity of the infrastructure; and
- generating a cluster of entities including the given entity by traversing the data structure along the vertices and the edges, starting with the given vertex,
- wherein an additional entity is added to the cluster of entities when the confidence score associated with an edge connecting a vertex representing the additional entity to another vertex representing a clustered entity exceeds a threshold value.

26. The system of claim 24, wherein the confidence score of the generated edge is adjusted based on a comparison of an entity type associated with the first entity and the entity type associated with the second entity.

27. The system of claim 20, wherein analyzing the usage data to determine the correlation comprises determining that the first operation and the second operation each occur within a threshold period of time with respect to each other.

28. A system configured to process data representing operations of an infrastructure of a computing system to identify relationships between entities of the infrastructure, the computing system comprising:
- at least one processor; and a memory configured for storing instructions that, when executed by the at least one processor, cause the at least one processor to perform operations comprising:
  - receiving a request for event data that represents operations of the computing system that are related to a given entity of the infrastructure of the computing system;
  - retrieving, from a data source, a data structure comprising vertices and edges, wherein each vertex of the data structure represents an entity of the infrastructure and wherein each edge of the data structure represents a relationship between entities of the infrastructure,
  - wherein at least one edge represents a determined relationship between a first entity and a second entity based on an analysis of first operations specifying the first entity and second operations specifying the second entity;
  - selecting a given vertex representing the given entity of the infrastructure;
  - generating a set of entities including the given entity by traversing the data structure along the vertices and the edges, starting with the given vertex;
  - retrieving usage data for each entity of the set;
  - generating a message including a particular suggestion for remediation of at least one anomaly of the computing system based on the order of the usage data that is derived from traversing the data structure; and
  - outputting the event data and the message.

29. The system of claim 28, wherein the operations further comprise providing a prediction of a future anomaly of the computing system, the prediction derived from the order of the usage data in the event data.

30. The system of claim 28, wherein the event data comprises a root cause analysis of anomalies related to the computing system, the root cause analysis specifying a common source for the anomalies.

31. The system of claim 28, wherein the operations further comprise generating a message including at least one suggestion for remediation of at least one anomaly of the computing system.

32. The system of claim 28, wherein an additional entity is added to the set of entities when a confidence score associated with an edge connecting a vertex representing the additional entity to another vertex representing an entity of the set exceeds a threshold value.

33. The system of claim 28, wherein the entity comprises one of a performance metric of the computing system, an alert specifying behavior of the computing system, a service responsive to a request received by the computing system, a team representing a plurality of users of the computing system, a tag, or a graphical user interface configured to report data about the computing system.

34. One or more non-transitory computer readable media storing instructions that are executable by one or more processors configured to perform operations comprising:
    receiving usage data representing a plurality of operations performed by a computing system, the usage data specifying, for each operation of the plurality, at least one entity of an infrastructure of the computing system that is related to that operation;
    retrieving a data structure comprising vertices and edges, wherein each vertex of the data structure represents an entity of the infrastructure, and wherein each edge of the data structure represents a relationship between entities of the infrastructure;
    analyzing the usage data to determine a correlation between a first operation specifying a first entity and a second operation specifying a second entity;
    determining a type of the correlation between the first operation and the second operation, the type representing an explicit containment relationship between the first entity and the second entity or an indirect relationship between the first entity and the second entity;
    generating an edge in the data structure between the first entity specified by the first operation and the second entity specified by the second operation, a type of the edge being based on the type of the correlation; an
    generating event data comprising the usage data specifying either the first entity or the second entity, wherein a format of the event data corresponds to positions of the first entity and the second entity in the data structure and the type of the edge in the data structure, wherein a message specifying a remediation is generated based on traversing the data structure in an order, and wherein the order is based on the type of the edge.

35. One or more non-transitory computer readable media storing instructions that are executable by one or more processors configured to perform operations comprising:
    receiving a request for event data that represents operations of a computing system that are related to a given entity of an infrastructure of the computing system;
    retrieving a data structure comprising vertices and edges, wherein each vertex of the data structure represents an entity of the infrastructure and wherein each edge of the data structure represents a relationship between entities of the infrastructure,
    wherein at least one edge represents a determined relationship between a first entity and a second entity based on an analysis of first operations specifying the first entity and second operations specifying the second entity;
    selecting a given vertex representing the given entity of the infrastructure;
    generating a set of entities including the given entity by traversing the data structure along the vertices and the edges, starting with the given vertex;
    retrieving usage data for each entity of the set;
    generating a message including a particular suggestion for remediation of at least one anomaly of the computing system based on the order of the usage data that is derived from traversing the data structure: and outputting the event data and the message.

* * * * *

UNITED STATES PATENT AND TRADEMARK OFFICE
CERTIFICATE OF CORRECTION

| | | |
|---|---|---|
| PATENT NO. | : 11,323,463 B2 | Page 1 of 1 |
| APPLICATION NO. | : 16/442192 | |
| DATED | : May 3, 2022 | |
| INVENTOR(S) | : Homin Lee | |

It is certified that error appears in the above-identified patent and that said Letters Patent is hereby corrected as shown below:

In the Claims

Column 27, Line 12:
In Claim 2, delete "receiving a receiving a" and insert -- receiving a --.

Column 29, Line 46:
In Claim 21, delete "receiving a receiving a" and insert -- receiving a --.

Column 31, Line 32:
In Claim 34, delete "an" and insert -- and --.

Column 32, Line 31:
In Claim 35, delete "structure:" and insert -- structure; --.

Signed and Sealed this
Ninth Day of August, 2022

*Katherine Kelly Vidal*

Katherine Kelly Vidal
*Director of the United States Patent and Trademark Office*